US010362597B2

(12) United States Patent
Andersson et al.

(10) Patent No.: US 10,362,597 B2
(45) Date of Patent: Jul. 23, 2019

(54) PERIODIC UPLINK GRANT ALIGNMENT IN A CELLULAR NETWORK

(71) Applicant: Telefonaktiebolaget LM Ericsson (publ), Stockholm (SE)

(72) Inventors: Eric Andersson, Järfälla (SE); Ying Sun, Sundbyberg (SE); Lotta Voigt, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

(21) Appl. No.: 15/500,139

(22) PCT Filed: Aug. 26, 2014

(86) PCT No.: PCT/EP2014/068058
§ 371 (c)(1),
(2) Date: Jan. 30, 2017

(87) PCT Pub. No.: WO2016/029933
PCT Pub. Date: Mar. 3, 2016

(65) Prior Publication Data
US 2017/0251492 A1 Aug. 31, 2017

(51) Int. Cl.
*H04W 72/14* (2009.01)
*H04W 72/12* (2009.01)
*H04W 88/08* (2009.01)

(52) U.S. Cl.
CPC ....... *H04W 72/14* (2013.01); *H04W 72/1289* (2013.01); *H04W 88/08* (2013.01)

(58) Field of Classification Search
None
See application file for complete search history.

(56) References Cited

U.S. PATENT DOCUMENTS

2012/0176984 A1 7/2012 Susitaival et al.
2012/0275421 A1* 11/2012 Vukovic ........... H04W 72/1268
370/329

(Continued)

FOREIGN PATENT DOCUMENTS

WO 2013085441 A1 6/2013
WO WO-2013085441 A1 * 6/2013 ........ H04W 72/1226

OTHER PUBLICATIONS

NTT DOCOMO et al. "Persistent Scheduling" 3GPP TSG RAN WG2 R2-061920, Jun. 2006, pp. 1-5.*

(Continued)

*Primary Examiner* — Adnan Baig
(74) *Attorney, Agent, or Firm* — Sage Patent Group

(57) ABSTRACT

A node (100, 200) of a cellular network controls sending of first uplink grants to a communication device (10). The first uplink grants indicate first uplink radio resources allocated to the communication device (10) and are sent in response to receiving scheduling requests from the communication device (10). Further, the node (100, 200) controls sending of second uplink grants to the communication device (10). The second uplink grants indicate second uplink radio resources allocated to the communication device (10) and are sent according to a configured periodicity. Depending on a periodicity of opportunities for transmission of the scheduling requests by the communication device (10) and the configured periodicity of sending the second uplink grants, the node (100, 200) controls an alignment of the sending of the second uplink grants with respect to the opportunities for transmission of the scheduling requests.

21 Claims, 8 Drawing Sheets

(56) References Cited

U.S. PATENT DOCUMENTS

2013/0301446 A1 11/2013 Chen et al.
2013/0308610 A1 11/2013 Bergstrom et al.

OTHER PUBLICATIONS

NTT DOCOMO, Inc. "Persistent Scheduling"; 3GPP TSG RAN WG2 Ad Hoc on LTE; R2-061920; Jun. 27-30, 2006; pp. 1-5; 3rd Generation Partnership Project; Sophia-Antipolis, Cedex, France.

* cited by examiner

10,362,597 B2

PERIODIC UPLINK GRANT ALIGNMENT IN A CELLULAR NETWORK

TECHNICAL FIELD

The present invention relates to methods for controlling radio transmission in a cellular network and to corresponding devices.

BACKGROUND

In cellular networks, allocation of radio resources to a certain user equipment (UE), also referred to as scheduling, is typically accomplished dynamically on the network side. In the downlink (DL) direction from the cellular network to the UE, a network node may allocate radio resources in accordance with a need to transmit DL data to the UE. The network node may then inform the UE about the allocated resources by sending a DL assignment. For the uplink (UL) direction from the UE to the cellular network, a scheduling request which is sent by the UE to the cellular network may be used to indicate that the UE needs radio resources for sending UL data. An exemplary scenario based on the LTE (Long Term Evolution) radio access technology specified by 3GPP (3$^{rd}$ Generation Partnership Project) is illustrated in FIG. 1. To provide fast scheduling, a base station of the LTE radio access technology, referred to as "evolved Node B" (eNB) is responsible for the scheduling. This may be accomplished dynamically, taking into account the instantaneous traffic pattern and radio propagation characteristics of each UE.

As illustrated in FIG. 1, a UE 10 which needs to send UL data may first send a scheduling request 101 to an eNB 20 which serves the cell of the UE 10. The scheduling request 101 may be sent on a UL control channel, referred to as PUCCH (Physical Uplink Control Channel), providing dedicated resources for sending scheduling requests by the UE 10. These dedicated resources are provided with a certain time periodicity, e.g., every 10 ms. Alternatively, the scheduling request 101 may be sent on a contention based random access channel (RACH). At step 102, the eNB 20 allocates UL radio resources to the UE 10. The amount of allocated resources may vary from between different scheduling transactions. The allocated UL radio resources are indicated in an UL grant 103, which is sent from the eNB 20 to the UE 10. Using the allocated UL radio resources, the UE 10 may then send the UL data 104 to the eNB 20. In addition, the UE 10 may also send a buffer status report (BSR) indicating the amount of buffered UL data to be sent by the UE 10.

In the above process of transmitting the UL data 104, latency occurs which is due to the sending of the scheduling request 101 before the UE 10 can proceed with the transmission of the UL data 104. However, such delay is not desirable in many cases. For example, certain data traffic may be sensitive to latency, such as data traffic associated with online gaming.

The latency problem associated with the sending of scheduling requests can be illustrated by the following example: When the UE 10 has been assigned dedicated resources for sending scheduling requests this means that the UE 10 has a periodic opportunity to send a scheduling request. In the present example a periodicity of 10 ms is assumed. In the worst case scenario, data arrives in an UL transmission buffer of the UE 10 just after an opportunity of sending a scheduling request. Accordingly, the UE 10 will have to wait almost 10 ms for the next opportunity to send a scheduling request. The eNB 20 will respond to the scheduling request with a UL grant, which takes another 2 ms. Accordingly, the delay between data in the UL transmission buffer and the possibility to send the data is at least 12 ms, which may be too long for certain applications.

A known way to address the latency problem is to use periodic pre-scheduling as for example described in WO 2013/085441 A1. In this case, the eNB periodically send UL grants to the UE, without a preceding scheduling request. By the periodic pre-scheduling, a reduced scheduling delay can be achieved, however at the cost of increased resource consumption because resource may be allocated to the UE which are actually not required and the UE needs to respond to each UL grant. Accordingly, it is desirable to utilize the periodic pre-scheduling in the most efficient way.

Accordingly, there is a need for techniques which allow for efficiently controlling radio transmissions in a cellular network, in particular with respect to the scheduling of UL transmissions by periodically sending UL grants.

SUMMARY

According to an embodiment of the invention, a method of controlling radio transmission in a cellular network is provided. According to the method, a node of the cellular network controls sending of first UL grants to the communication device. The first UL grants indicate first UL radio resources allocated to the communication device and are sent in response to receiving scheduling requests from the communication device. Further, the node controls sending of second UL grants to the communication device. The second UL grants indicate second UL radio resources allocated to the communication device and are sent according to a configured periodicity. Depending on a periodicity of opportunities for transmission of the scheduling requests by the communication device and the configured periodicity of sending the second UL grants, the node controls an alignment of the sending of the second UL grants with respect to the opportunities for transmission of the scheduling requests.

According to a further embodiment of the invention, a node for a cellular network is provided. The node comprises an interface for controlling communication by a communication device. Further, the node comprises at least one processor. The at least one processor is configured to control sending of first UL grants to the communication device. The first UL grants indicate first UL radio resources allocated to the communication device and are sent in response to receiving scheduling requests from the communication device. Further, the at least one processor is configured to control sending of second UL grants to the communication device. The second UL grants indicate second UL radio resources allocated to the communication device and are sent according to a configured periodicity. Further, the at least one processor is configured to control, depending on a periodicity of opportunities for transmission of the scheduling requests by the communication device and the configured periodicity of sending the second ULk grants, an alignment of the sending of the second UL grants with respect to the opportunities for transmission of the scheduling requests.

According to a further embodiment of the invention, a computer program or computer program product is provided, e.g., in the form of a non-transitory storage medium, which comprises program code to be executed by at least one processor of a network node of a cellular network. Execution of the program code causes the at least one processor to control sending of first UL grants to the communication device. The first UL grants indicate first UL radio resources allocated to the communication device and are sent in response to receiving scheduling requests from the communication device. Further, execution of the program code causes the at least one processor to control sending of second UL grants to the communication device. The second UL grants indicate second UL radio resources allocated to the communication device and are sent according to a configured periodicity. Further, execution of the program code causes the at least one processor to control, depending on a periodicity of opportunities for transmission of the scheduling requests by the communication device and the configured periodicity of sending the second UL grants, an alignment of the sending of the second UL grants with respect to the opportunities for transmission of the scheduling requests.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to concepts for controlling radio transmission in a cellular network. The embodiments specifically refer to a scenario using LTE radio access technology. However, it should be understood that the concepts could also be applied in connection with other radio access technologies, e.g., Universal Mobile Telecommunications System (UMTS) radio access technology.

According to the illustrated concepts, UL transmissions from a communication device to the cellular network are performed on radio resources which are based two types of UL grants: UL grants sent in response to scheduling requests by the communication device, in the following referred to as dynamic UL grants, and UL grants sent according to a configured periodicity, without requiring a scheduling request, in the following referred to as periodic UL grants. The time instances of sending the periodic UL grants are controlled to have a certain alignment with respect to opportunities for transmission of the scheduling requests. This is accomplished depending on a periodicity of the opportunities for sending the scheduling requests and depending on a periodicity of sending the periodic grants. In this way, the effect of the periodic UL grants on reduction of latency may be optimized.

Figure 1:
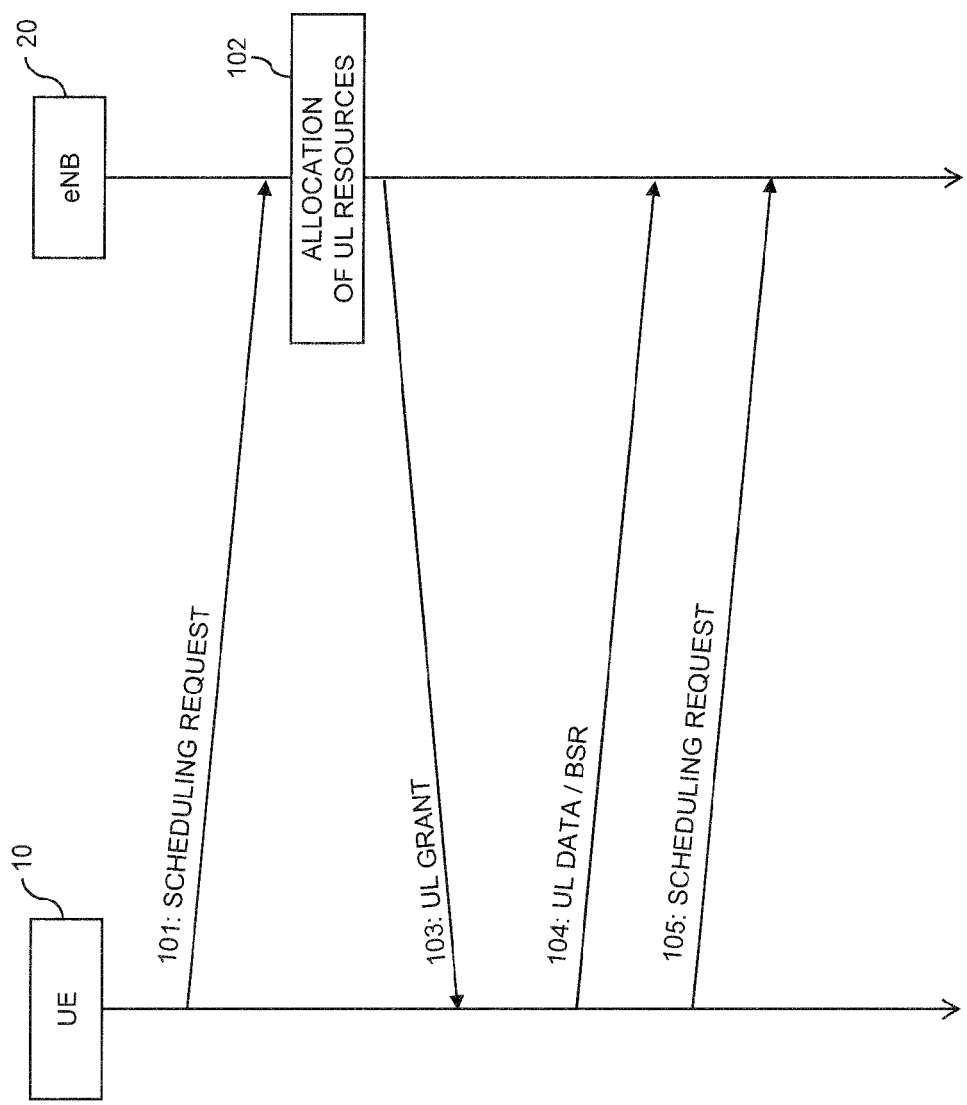
FIG. 1 schematically illustrates an exemplary process for performing a UL radio transmission from a UE to a cellular network.
Figure 2:
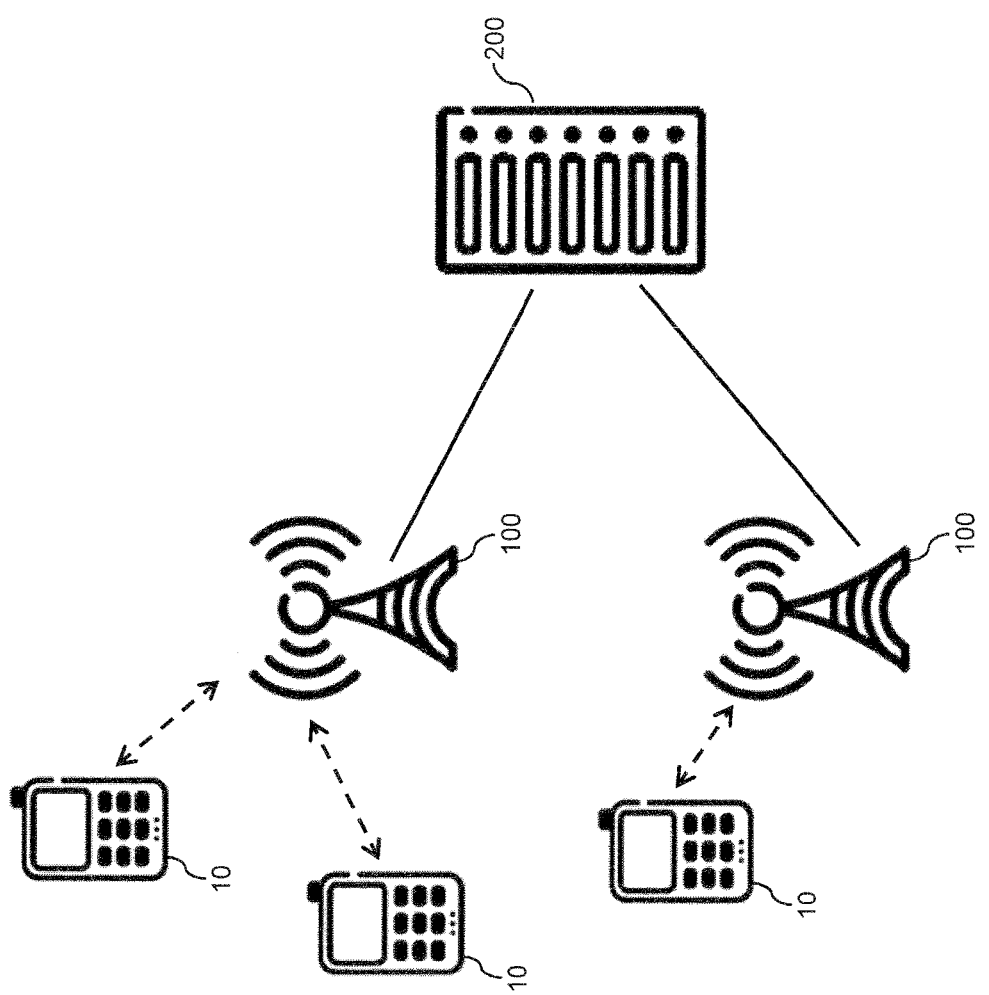
FIG. 2 schematically illustrates an exemplary cellular network environment with elements which may be involved in controlling UL scheduling according to an embodiment of the invention.

FIG. 2 illustrates exemplary elements which may be involved in implementing a corresponding control of an UL scheduling process. As examples of communication devices which may connect to the cellular network, FIG. 2 illustrates UEs 10. The UEs 10 may correspond to a mobile phone, a smartphone, a computer with wireless connectivity, or the like. However, it is to be understood that also other kinds of communication devices could connect to the cellular network. As examples of nodes of the cellular network which may control at least a part of the UL scheduling process, FIG. 2 illustrates base stations 100 and a management node 200. In accordance with the assumed utilization of the LTE radio access technology, the base stations 100 will in the following also be referred to as eNB. The eNBs 100 are assumed to be responsible for performing the scheduling of UL transmissions, e.g., UL transmissions from each of the UEs 10 to a respective one of the eNBs 100. These UL transmissions may be performed on UL radio resources indicated in dynamic UL grants or in periodic UL grants. From the perspective of the UE 10, the dynamic UL grants and the periodic UL grants may be handled in a similar manner. The management node 200 may be responsible for managing and configuring the eNBs 100.

In some scenarios, the sending of the dynamic UL grants and of the periodic UL grants to one of the UEs 10 may be controlled by the associated eNB 100, i.e., the eNB 100 to which the UE 10 has established a radio link. For example, the eNB 100 may select the UL radio resources which are indicated in the dedicated or periodic UL grants. Further, the eNB 100 may set the periodicity of the opportunities for transmission of the scheduling requests, e.g., as a part of a process of allocating UL radio resources for sending the scheduling requests, e.g., radio resources of a PUCCH. The eNB 100 may also set the periodicity of sending the periodic UL grants, e.g., depending on a traffic load of the UE 10 and/or depending on a channel quality experienced by the UE 10. For example, if the UE 10 generates a high traffic load, specifically a high traffic load in the UL direction, the eNB 100 may decide to send the periodic UL grants with a periodicity corresponding to short time intervals, and if the UE 10 generates a lower traffic load, the eNB 100 may decide to send the periodic UL grants with a periodicity corresponding to longer time intervals. Similarly, if the UE 10 experiences a high channel quality, the eNB 100 may decide to send the periodic UL grants with a periodicity corresponding to short time intervals, and if the UE 10 experiences a lower channel quality, the eNB 100 may decide to send the periodic UL grants with a periodicity corresponding to longer time intervals. Still further, the eNB 100 may control the alignment of sending the periodic UL grants with respect to the opportunities for transmission of the scheduling requests, e.g., by setting an offset between a first periodic time pattern defined by the time instances of the opportunities for transmission of the scheduling requests and a second periodic time pattern defined by the time instances of sending the periodic UL grants. Details of processes for determining such offset will be further explained below.

In some scenarios, also the management node 200 may perform at least a part of the above-mentioned processes of controlling the sending of the dynamic UL grants and of the periodic UL grants. For example, the management node 200 could set the periodicity of the opportunities for transmission of the scheduling requests, the periodicity of sending the periodic UL grants, and/or the alignment of sending the periodic UL grants with respect to the opportunities of sending the scheduling requests. The eNB 100 could then perform the UL scheduling process in accordance with corresponding control information from the management node 200.

It is to be understood that also other nodes may be involved in controlling at least a part of the UL scheduling process. For example, when utilizing the UMTS radio access technology, a control node referred to as RNC (Radio Network Controller) could implement similar functionalities as explained for the eNB 100.

Figure 3:
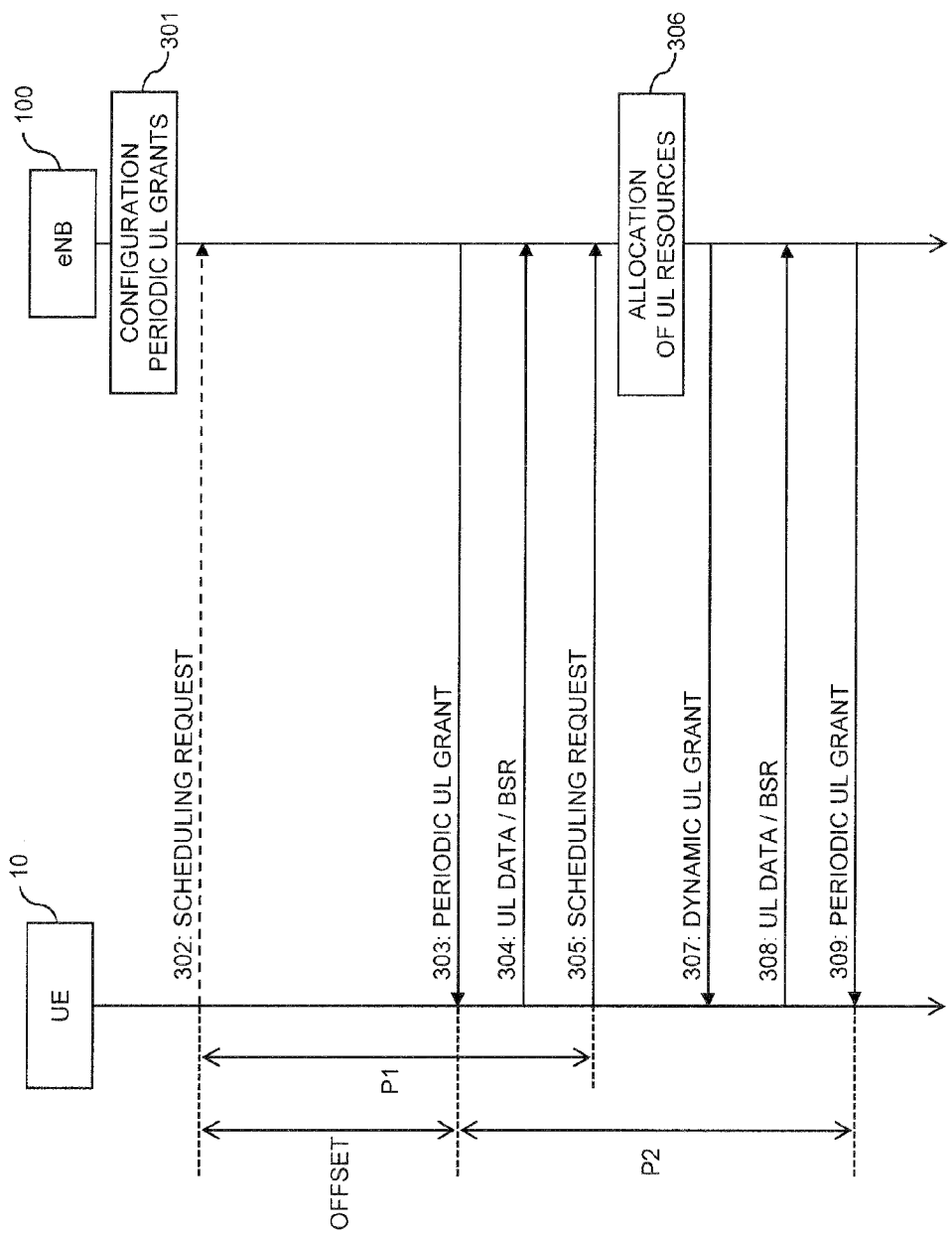
FIG. 3 schematically illustrates an exemplary process for performing UL radio transmissions from a UE to a cellular network according to an embodiment of the invention.

FIG. 3 shows an exemplary processes of performing UL transmissions which is based on the above concepts. The processes of FIG. 3 involve the UE 10 and the eNB 100.

At step 301, the eNB 100 configures the periodic UL grants. This may for example include setting the periodicity of sending the periodic UL grants and setting the offset of the periodic UL grants with respect to the opportunities for transmission of the scheduling requests. Further, this may include selecting UL radio resources which are indicated in the periodic UL grants. In some scenarios, the UL radio resources which are indicated in the periodic UL grants may also be selected individually for each of the periodic UL grants, e.g., at the time of sending the respective periodic UL grant.

The dashed arrow 302 indicates an opportunity for transmission of a scheduling request by the UE 10. In the example of FIG. 3, it is assumed that the UE 10 does not send a scheduling request at the opportunity 302, e.g., because there are no pending UL data for transmission. Because the UE 10 did not send a scheduling request at the opportunity 302, the eNB 100 sends no dynamic UL grant.

However, a certain time interval after the opportunity 302, the eNB 100 sends one of the periodic UL grants 303. A time interval between the opportunity 302 for transmission of a scheduling request and the sending of the periodic UL grant 303 corresponds to the above-mentioned offset.

In the scenario of FIG. 3, it is assumed that the UE 10 now has UL data pending for transmission. Accordingly, the UE 10 performs a transmission 304 with at least a part of the UL data to the eNB 100. This is accomplished on the UL radio resources indicated in the periodic UL grant 303. As illustrated, the transmission 304 may also include a BSR indicating the amount of buffered UL data still pending for transmission at the UE 10. Because the UE 10 did not need to send a scheduling request to receive the periodic UL grant 303, the transmission 304 can be performed with low latency.

In the scenario of FIG. 3, it is further assumed that after sending the transmission 304 further UL data pending for transmission have been buffered by the UE 10. Accordingly, at the UE 10 sends scheduling request 305 at the next opportunity. The time interval between the opportunity 302 and sending the scheduling request 305 is defined by the periodicity of the opportunities for transmission of the scheduling requests, in FIG. 3 indicated by P1. The periodicity P1 may be quantified by the time interval between two subsequent opportunities for transmission of the scheduling request.

In response to the scheduling request 305, the eNB 100 sends a dynamic UL grant 307 to the UE 10. The UE 10 may then perform a transmission 308 with at least a part of the buffered UL data to the eNB 100. This is accomplished on the UL radio resources indicated in the dynamic UL grant 307.

As further illustrated, the UE 10 then receives a next periodic UL grant 309. The time interval between the periodic UL grant 303 and the next periodic UL grant 309 is defined by the configured periodicity of the periodic UL grants, in FIG. 3 indicated by P2. The periodicity P2 may be quantified by the time interval between two subsequent periodic UL grants, such as the periodic UL grants 303 and 309. An alignment of the periodic UL grants with respect to the opportunities for transmission of the scheduling requests is defined by the above-mentioned offset.

By setting the offset, the latency experienced by the UE 10 can be optimized. In the example of FIG. 3, it can be seen that an offset which shifts the time instance of sending the periodic UL grants too close to the opportunities for transmission of the scheduling requests will have the effect that the periodic UL grant is not received significantly earlier than the next possible dynamic UL grant. This will be further explained by considering exemplary scenarios as illustrated in FIGS. 4, 5, and 6.

Figure 4:
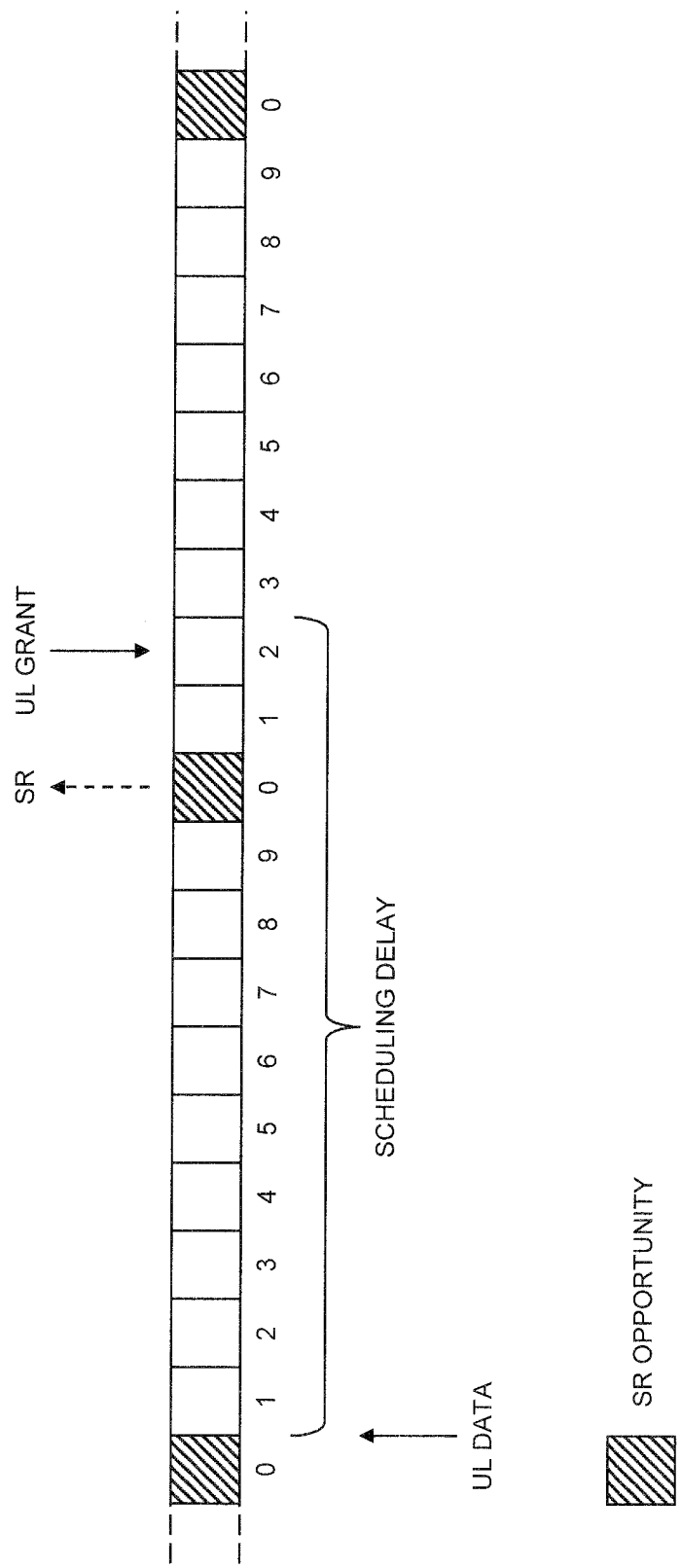
FIG. 4 schematically illustrates an exemplary scenario in which UL grants are provided only in response to scheduling requests.
Figure 5:
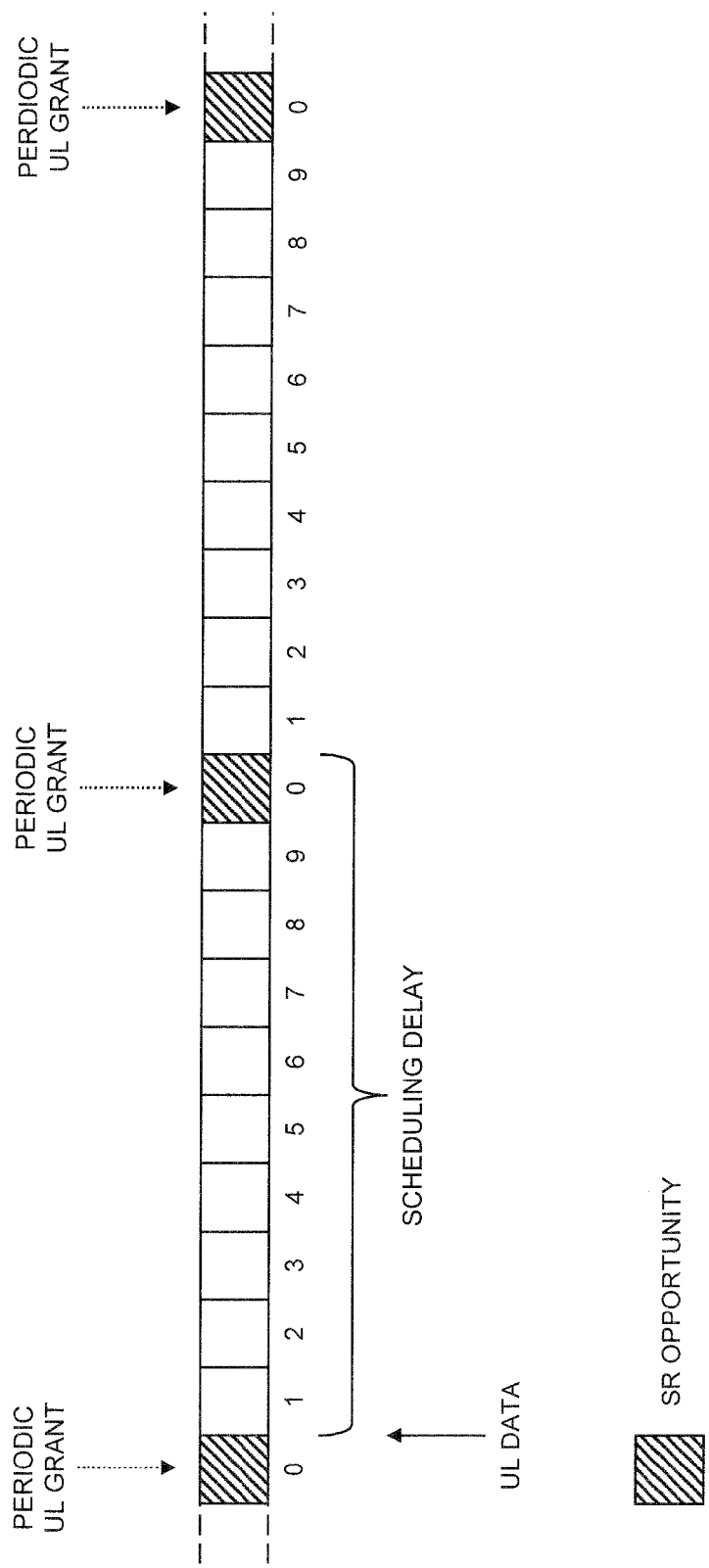
FIG. 5 schematically illustrates an exemplary scenario in which UL grants are provided in response to scheduling requests and according to a configured periodicity, but with suboptimal alignment of the periodic UL grants with respect to opportunities for sending scheduling requests.
Figure 6:
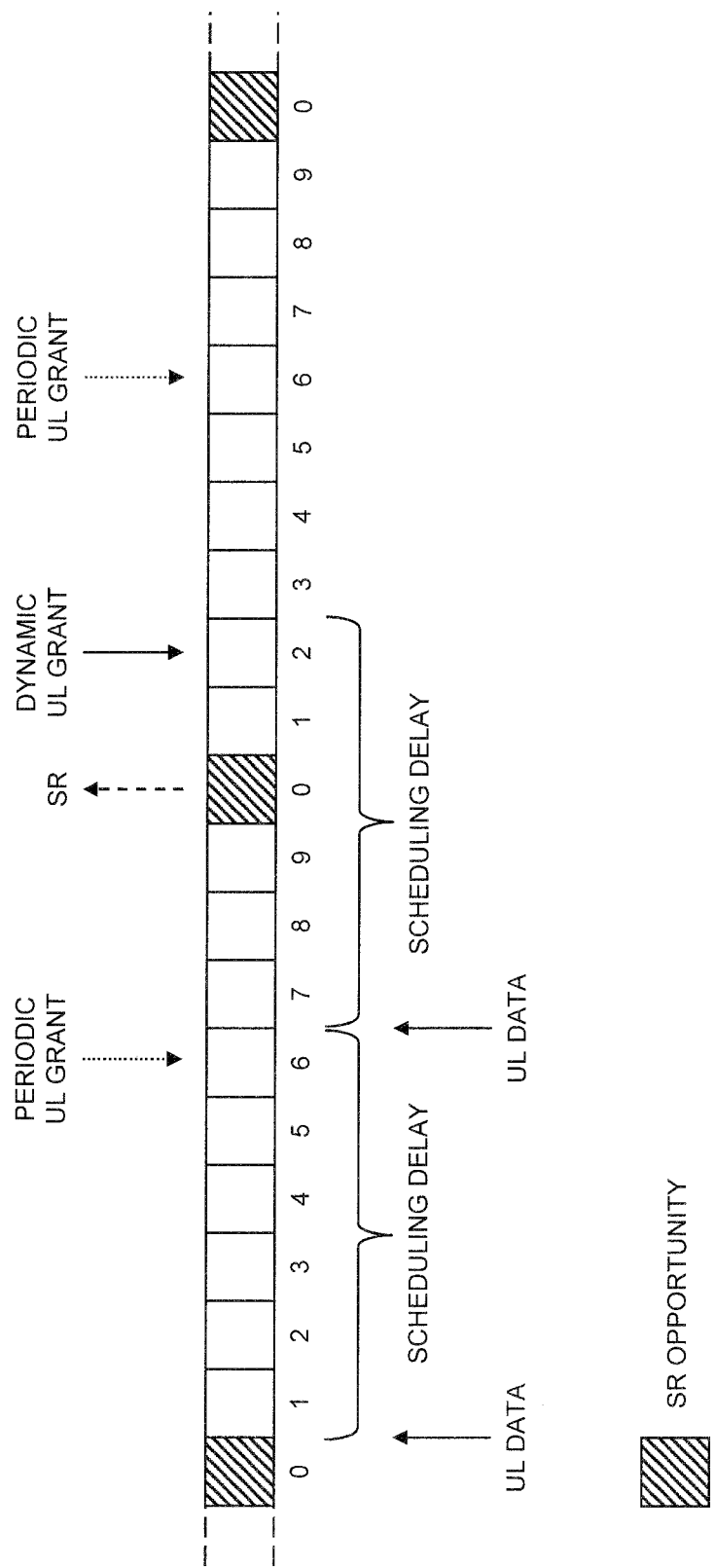
FIG. 6 schematically illustrates an exemplary scenario in which UL grants are provided in response to scheduling requests and according to a configured periodicity, with optimized alignment of the periodic UL grants with respect to opportunities for sending scheduling requests.

In the scenarios of FIGS. 4, 5, and 6, it is assumed that the periodicity of the opportunities for transmission of the scheduling requests is 10 ms, measured between two subsequent opportunities for transmission of a scheduling request. In the scenario of FIG. 4, no periodic UL grants are provided. In the scenarios of FIGS. 5 and 6, the periodicity of the periodic UL grants is assumed to be equal to the periodicity of the opportunities for transmission of the scheduling requests, i.e., 10 ms measured between two subsequent periodic UL grants. FIGS. 4, 5, 6 illustrate a sequence of TTIs (TTI: transmission time interval) each having a duration of 1 ms. These TTIs may correspond to subframes as defined for the LTE radio access technology. The TTIs which correspond to an opportunity of sending a scheduling request (SR) are shown as shaded boxes.

As can be seen, in the scenario of FIG. 4, which does not benefit from the periodic UL grants, a scheduling delay between arrival of UL data and receiving a scheduling grant is 12 ms. This is due to the fact that the arrival of the UL data is immediately after an opportunity for transmission of a scheduling request (in TTI 0). The UE therefore needs to wait until the next opportunity for transmission of a scheduling request (10 ms later in TTI 0). The dynamic UL grant provided in response to the scheduling request is received two TTIs later, which amounts to a scheduling delay of 12 ms. The scenario of FIG. 4 corresponds to a worst-case scenario with respect to the scheduling delay. In scenarios where the arrival of the UL data is closer to the next opportunity for transmission of a scheduling request, a lower scheduling delay would be observed.

In the scenario of FIG. 5, the alignment of the periodic UL grants with respect to the opportunities for transmission of the scheduling requests is such that the periodic UL grants are received in the TTIs corresponding to the opportunities for transmission of the scheduling requests, corresponding to an offset of zero. As can be seen, the scheduling delay observed for an arrival of the UL data immediately after an opportunity for transmission of a scheduling request (in TTI 0), is 10 ms, which corresponds to a slight improvement with respect to the scenario of FIG. 4. This improvement can be attributed to the fact that the UE does not need to wait for another 2 ms after sending a scheduling request, but receives the periodic UL grant already in the same TTI in which the scheduling request could be sent (10 ms after arrival of the UL data in TTI 0).

A scenario with an optimized value of the offset is illustrated in FIG. 6. In the scenario of FIG. 6, an offset of 6 TTIs is assumed, i.e., the periodic UL grants are received in TTI 6. As can be seen, UL data arriving after the opportunity for transmission of a scheduling request but before receiving the periodic UL grant will experience a maximum scheduling delay of 6 TTIs. Similarly, UL data arriving after receiving the periodic UL grant, but before the next opportunity for transmission of a scheduling request can be sent by sending a scheduling request at the next opportunity and utilizing the UL radio resources indicated in the dynamic UL grant received two TTIs later, which also corresponds to a maximum scheduling delay of 6 TTIs.

The optimized value of the offset may be determined depending on the two periodicities, i.e., the periodicity P1 of the opportunities for transmission of the scheduling requests and the periodicity P2 of sending the periodic UL grants. For these periodicities P1, P2, the maximum scheduling delay $f_{P1,P2}(k)$ may be determined for each possible value k of the offset (which are typically defined with a granularity of the utilized TTIs). The optimized value of the offset may then be determined as $$\operatorname{argmin} f_{P1,P2}(k),$$

$$0<k<\operatorname{lcm}(P1,P2) \quad (1)$$

where k, P1, P2 may define the periodicities and the offset as integer multiples off the duration of a TTI and lcm(P1,P2) denotes the least common multiple of the two periodicities P1, P2.

As can also be seen from the examples of FIGS. 4 to 6, when the two periodicities P1, P2 are equal, a suitable setting of the offset may be obtained by selecting a value which corresponds to about half the maximum scheduling delay in a situation without periodic UL grants (e.g., as illustrated by FIG. 4). In that case, the maximum scheduling delay with respect to the next periodic UL grant and the maximum scheduling delay with respect to the next possible dynamic UL grant are equal.

Figure 7:
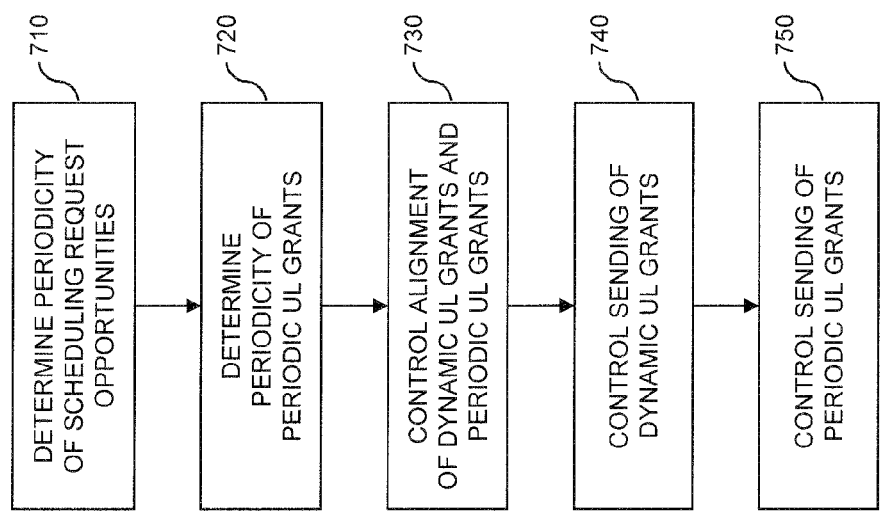
FIG. 7 shows a flowchart for illustrating a method according to an embodiment of the invention.

FIG. 7 shows a flowchart for illustrating a method of controlling radio transmission in a cellular network. The method may be used for implementing the above-described concepts in a node of the cellular network. For example, this node may be responsible for scheduling radio transmissions, such as an eNB when using LTE radio access technology or an RNC when using UMTS radio access technology. The node may for example correspond to one of the base stations 100 or to the management node 200 as shown in FIG. 2. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 710, the node may determine a periodicity of opportunities for transmission of scheduling requests by a communication device. The communication device may for example correspond to one of the UEs 10 as illustrated in FIG. 2. When the cellular network is based on the LTE radio technology, the opportunities for transmission of the scheduling requests may correspond to UL radio resources on a PUCCH.

At step 720, the node may determine a periodicity of periodic UL grants. The periodicity of the periodic UL grants may for example be equal to or larger than the periodicity of the opportunities for transmission of the scheduling requests. The periodicity of the periodic UL grants and the periodicity of the opportunities for transmission of the scheduling requests may be integer multiples of each other.

Step 720 may also involve that, the node configures the periodicity of sending the second UL grants. This may be accomplished depending on one or more criteria. These criteria may for example include a traffic load of the communication device and/or a channel quality experienced by the communication device.

At step 730, the node controls an alignment of the periodic UL grants with respect to the opportunities for transmission of the scheduling requests.

Step 730 may also involve determining a maximum scheduling delay depending on the periodicity of opportunities for transmission of the scheduling requests by the communication device and the configured periodicity of sending the second UL grants. The maximum delay may be defined between determining a need for transmission of UL data by the communication device and transmission of this UL data on the radio resources indicated in one of the first UL grants and the second UL grants, e.g., as shown for the scheduling delay of FIGS. 5 and 6. The node may then control the alignment depending on the maximum delay.

Step 730 may also involve determining a least common multiple of the periodicity of opportunities for transmission of the scheduling requests by the communication device and the configured periodicity of sending the second UL grants. The node may then control the alignment depending on the least common multiple of the periodicities.

Step 730 may also involve selecting an offset between sending one of the second UL grants and a preceding one of the opportunities of sending the scheduling requests in such a way that it is smaller than the least common multiple of the periodicities.

Step 730 may also involve selecting the offset from candidate offsets which are smaller than the least common multiple of the periodicities, in such a way that the selected offset corresponds to that one having the smallest maximum scheduling delay. For example, this may be achieved by determining the offset according to (1).

At step 740, the node controls sending of first UL grants to the communication device. The first UL grants are sent in response to scheduling requests which may be transmitted at the opportunities for transmission of the scheduling requests, e.g., having a periodicity as determined at step 710. This may also involve that the node sends the first UL grants to the communication device, e.g., if the node corresponds to a base station, such as the eNB 100.

At step 750, the node controls sending of second UL grants to the communication device. The second UL grants are sent according to a configured periodicity, e.g., as determined at step 720. This may also involve that the node sends the second UL grants to the communication device, e.g., if the node corresponds to a base station, such as the eNB 100.

Figure 8:
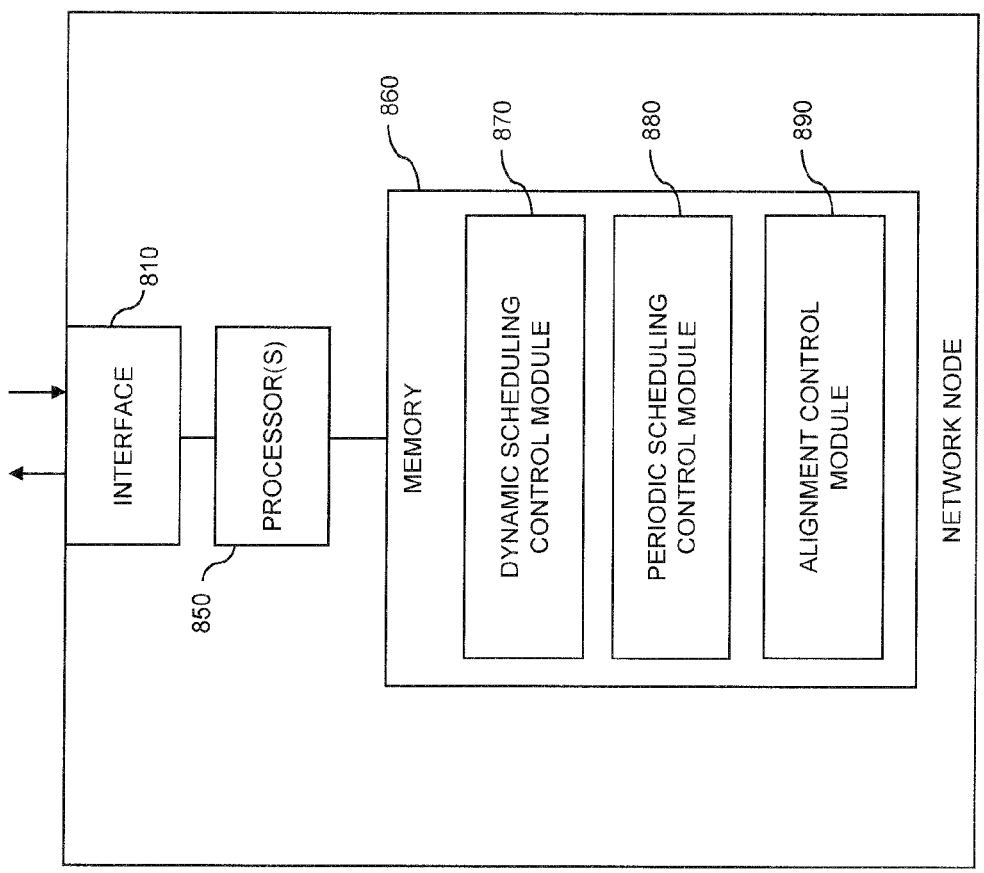
FIG. 8 schematically illustrates implementation of a network node according to an embodiment of the invention.

FIG. 8 illustrates exemplary structures which may be used for implementing the above concepts in a node of a cellular network.

As illustrated, the node may include an interface 810 for controlling transmissions by communication devices. If the node is implemented as a base station, such as an eNB in the LTE radio access technology, the interface 810 may be a radio interface for establishing a radio link to the communication devices. The interface 810 may then also be used for sending or receiving transmissions by the communication devices. In other scenarios, the node may implement a control node of a base station, such as an RNC of the UMTS radio access technology, and the interface 810 may be used for controlling the base station and for sending or receiving transmissions by the communication devices via the base station. In some scenarios, the node may also implement a management node, and the interface 810 may be used for managing, configuring, and/or controlling a base station or control node handling transmissions to or from the communication devices, e.g., for managing, configuring, and/or controlling an eNB or RNC.

Further, the node includes one or more processors 850 coupled to the interface 810, and a memory 860 coupled to the processor(s) 850. The memory 860 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 860 includes suitably configured program code to be executed by the processor(s) 850 so as to implement the above-described functionalities of the node. In particular, the memory 860 may include various program code modules for causing the node to perform processes as described above, e.g., corresponding to the method steps of FIG. 7. As illustrated, the memory 860 may include a dynamic scheduling control module 870 for implementing the above-described functionalities of controlling the sending of dynamic UL grants to the communication device. Further, the memory 860 may include a periodic scheduling control module 880 for implementing the above-described functionalities of controlling the sending of periodic UL grants to the communication device. Further, the memory 860 may include an alignment control module 890 for implementing the above-described functionalities of controlling the alignment of sending the dynamic UL grants with respect to the opportunities for transmission of the scheduling requests.

It is to be understood that the structures as illustrated in FIG. 8 are merely schematic and that the node may actually include further components which, for the sake of clarity, have not been illustrated, e.g., further interfaces or processors. Also, it is to be understood that the memory 860 may include further types of program code modules, which have not been illustrated, e.g., program code modules for implementing known functionalities of an eNB, RNC, or management node. According to some embodiments, also a computer program may be provided for implementing functionalities of the network node, e.g., in the form of a physical medium storing the program code and/or other data to be stored in the memory 860 or by making the program code available for download or streaming.

As can be seen, the concepts as described above may be used for optimizing the utilization of periodic UL grants with respect to latency experienced by a communication device. Specifically, by controlling the alignment as described above, an improved latency may be achieved without increasing the number of periodic UL grants sent to the communication device, which means that radio resources of the cellular network and typically also battery resources of the communication device may be saved.

It is to be understood that the examples and embodiments as explained above are merely illustrative and susceptible to various modifications. For example, some of the described functionalities may be distributed in different nodes, e.g., by implementing control of the sending of the periodic UL grants in a management node, while implementing control of the sending of the dynamic UL grants in a base station. Further, the illustrated nodes may be implemented by a single device or by a system of multiple devices. Further, it is to be understood that the periodicities P1 and P2 may be configured in various ways and do not need to be equal or integer multiples of each other. Moreover, it is to be understood that the above concepts may be implemented by using correspondingly designed software to be executed by one or more processors of an existing device, or by using dedicated device hardware.

The invention claimed is:

1. A method of controlling radio transmission in a cellular network, the method comprising:
a node of the cellular network controlling sending of first uplink grants to a communication device, the first uplink grants indicating first uplink radio resources allocated to the communication device and being sent in response to receiving scheduling requests from the communication device;
the node controlling sending of second uplink grants to the communication device, the second uplink grants indicating second uplink radio resources allocated to the communication device and being sent according to a configured periodicity; and
the node controlling, depending on a periodicity of opportunities for transmission of the scheduling requests by the communication device and the configured periodicity of sending the second uplink grants, an alignment of the sending of the second uplink grants with respect to the opportunities for transmission of the scheduling requests,
the method further comprising:
the node determining, depending on the periodicity of opportunities for transmission of the scheduling requests by the communication device and the configured periodicity of sending the second uplink grants, a maximum delay between determining a need for transmission of uplink data by the communication device and transmission of this uplink data on the radio resources indicated in one of the first uplink grants and the second uplink grants; and
the node controlling the alignment depending on the maximum delay.

2. The method of claim 1, further comprising:
the node determining a least common multiple of the periodicity of opportunities for transmission of the scheduling requests by the communication device and the configured periodicity of sending the second uplink grants; and
the node controlling the alignment depending on the least common multiple of the periodicities.

3. The method of claim 2, further comprising the node selecting an offset between sending one of the second uplink grants and a preceding one of the opportunities of sending the scheduling requests to be smaller than the least common multiple of the periodicities.

4. The method of claim 1, further comprising:
the node determining a least common multiple of the periodicity of opportunities for transmission of the scheduling requests by the communication device and the configured periodicity of sending the second uplink grants; and
the node controlling the alignment depending on the least common multiple of the periodicities;

the node selecting an offset between sending one of the second uplink grants and a preceding one of the opportunities of sending the scheduling requests to be smaller than the least common multiple of the periodicities; and wherein the node selects the offset, from candidate offsets smaller than the least common multiple of the periodicities, to correspond to that one having the smallest maximum scheduling delay.

5. The method of claim 1, wherein the periodicity of opportunities for transmission of the scheduling requests by the communication device and the configured periodicity of sending the second uplink grants are integer multiples of each other.

6. The method of claim 1, wherein the configured periodicity of sending the second uplink grants is equal to or larger than the periodicity of opportunities for transmission of the scheduling requests by the communication device.

7. The method of claim 1, further comprising the node, depending on one or more criteria, configuring the periodicity of sending the second uplink grants.

8. The method of claim 7, wherein the one or more criteria comprise a traffic load of the communication device and/or a channel quality experienced by the communication device.

9. The method of claim 1, further comprising: the node sending the first uplink grants and the second uplink grants to the communication device.

10. The method of claim 1, wherein the node is a base station of the cellular network.

11. A node for a cellular network, the network node comprising:
    processing circuitry,
    memory containing instructions executable by the processing circuitry whereby the node is operative to:
    control sending of first uplink grants to the communication device, the first uplink grants indicating first uplink radio resources allocated to the communication device and being sent in response to receiving scheduling requests from the communication device;
    control sending of second uplink grants to the communication device, the second uplink grants indicating second uplink radio resources allocated to the communication device and being sent according to a configured periodicity; and
    depending on a periodicity of opportunities for transmission of the scheduling requests by the communication device and the configured periodicity of sending the second uplink grants, control an alignment of the sending of the second uplink grants with respect to the opportunities for transmission of the scheduling requests,
    wherein the instructions are such that the node is operative to:
    depending on the periodicity of opportunities for transmission of the scheduling requests by the communication device and the configured periodicity of sending the second uplink grants, determine a maximum scheduling delay between determining a need for transmission of uplink data by the communication device and transmission of this uplink data on the radio resources indicated in one of the first uplink grants and the second uplink grants; and
    control the alignment depending on the maximum delay.

12. The node of claim 11, wherein the instructions are such that the node is operative to:
    determine a least common multiple of the periodicity of opportunities for transmission of the scheduling requests by the communication device and the configured periodicity of sending the second uplink grants; and
    control the alignment depending on the least common multiple of the periodicities.

13. The node of claim 12, wherein the instructions are such that the node is operative to select an offset between sending one of the second uplink grants and a preceding one of the opportunities of sending the scheduling requests to be smaller than the least common multiple of the periodicities.

14. The node of claim 11, wherein the instructions are such that the node is operative to:
    depending on the periodicity of opportunities for transmission of the scheduling requests by the communication device and the configured periodicity of sending the second uplink grants, determine a maximum scheduling delay between determining a need for transmission of uplink data by the communication device and transmission of this uplink data on the radio resources indicated in one of the first uplink grants and the second uplink grants;
    control the alignment depending on the maximum delay;
    select an offset between sending one of the second uplink grants and a preceding one of the opportunities of sending the scheduling requests to be smaller than the least common multiple of the periodicities; and
    wherein the offset is selected, from candidate offsets smaller than the least common multiple of the periodicities, to correspond to that one having the smallest maximum scheduling delay.

15. The node of claim 11, wherein the periodicity of opportunities for transmission of the scheduling requests by the communication device and the configured periodicity of sending the second uplink grants are integer multiples of each other.

16. The node of claim 11, wherein the configured periodicity of sending the second uplink grants is equal to or larger than the periodicity of opportunities for transmission of the scheduling requests by the communication device.

17. The node of claim 11, wherein the instructions are such that the node is operative to configure the periodicity of sending the second uplink grants depending on one or more criteria.

18. The node of claim 17, wherein the one or more criteria comprise a traffic load of the communication device and/or a channel quality experienced by the communication device.

19. The node of claim 11, wherein the instructions are such that the node is operative to send the first uplink grants and the second uplink grants to the communication device.

20. The node of claim 11, wherein the node is a base station of the cellular network.

21. A non-transitory computer readable recording medium storing a computer program product for controlling radio transmission in a cellular network, the computer program product comprising software instructions which, when run on processing circuitry of a network entity, causes the network entity to:
    control sending of first uplink grants to a communication device, the first uplink grants indicating first uplink radio resources allocated to the communication device and being sent in response to receiving scheduling requests from the communication device;
    control sending of second uplink grants to the communication device, the second uplink grants indicating second uplink radio resources allocated to the communication device and being sent according to a configured periodicity; and control, depending on a periodicity of opportunities for transmission of the scheduling requests by the communication device and the configured periodicity of sending the second uplink grants, an alignment of the sending of the second uplink grants with respect to the opportunities for transmission of the scheduling requests, the method further comprising:

the node determining, depending on the periodicity of opportunities for transmission of the scheduling requests by the communication device and the configured periodicity of sending the second uplink grants, a maximum delay between determining a need for transmission of uplink data by the communication device and transmission of this uplink data on the radio resources indicated in one of the first uplink grants and the second uplink grants; and the node controlling the alignment depending on the maximum delay.

* * * * *